Aug. 9, 1938.  W. P. SCHMITTER  2,126,691
SPEED REDUCER
Filed Dec. 6, 1935
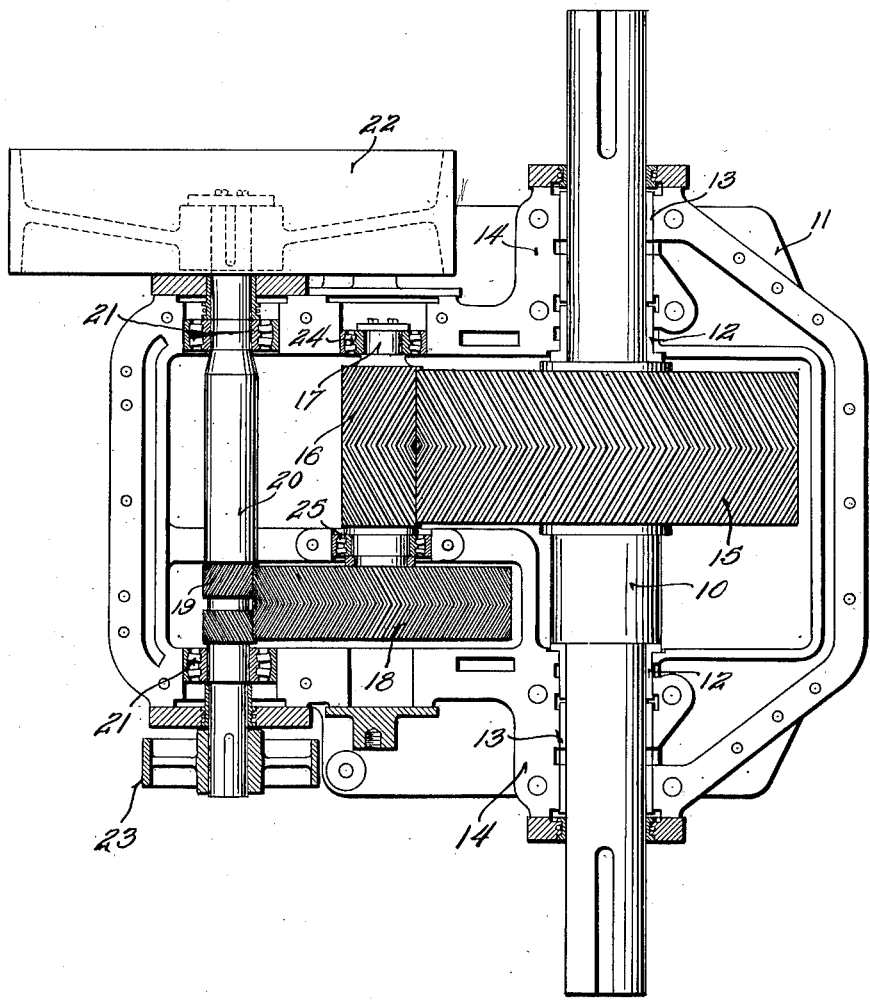
INVENTOR.
WALTER P. SCHMITTER
BY
ATTORNEY.

Patented Aug. 9, 1938

2,126,691

UNITED STATES PATENT OFFICE 2,126,691

SPEED REDUCER

Walter P. Schmitter, Milwaukee, Wis., assignor to The Falk Corporation, Milwaukee, Wis., a corporation of Wisconsin Application December 6, 1935, Serial No. 53,224

3 Claims. (Cl. 74—410)

This invention relates to gear sets, commonly known as speed reducers, for converting rotary motion at one speed into rotary motion at a higher or lower speed.

The intermediate shaft in speed reducers, involving two or more stages of speed reduction, carries a wide faced pinion which meshes with a gear on a shaft of lower speed, and also carries a gear which meshes with a pinion on a shaft of higher speed. As heretofore designed, the intermediate shaft is ordinarily journalled in bearings at its opposite ends, so that the gear and pinion thereon are both arranged between the bearings. When so arranged, the load reaction upon the pinion tends to bend the pinion and shaft and the load reaction on the gear tends to further bend the pinion and shaft in the same direction. The capacity of the speed reducer is limited by these conditions in the intermediate shaft.

An object of the present invention is to increase the load capacity of speed reducers by a novel arrangement of parts which will reduce pinion deflection to a minimum.

Other objects and advantages will appear, expressed or implied, from the following description of an illustrative embodiment of the present invention.

The single figure of the drawing is a plan view of a speed reducer constructed in accordance with the present invention, the cover portion of the housing thereof being removed to better illustrate the gearing.

Although the speed reducer of the present invention is capable of general industrial use, the particular unit selected for illustration is intended primarily for use in the oil fields as a driver for oil well pumps. It includes a heavy duty, low speed shaft 10 journalled in and projecting from a horizontally split housing, the lower half or base of which is shown at 11. In this instance, each end of the shaft 10 is supported in a pair of longitudinally split sleeve bearings 12 and 13 fixed in extended bearing hubs 14 formed on the housing; and each projecting end of the shaft is adapted to receive and drive a pump operating crank of any standard or approved type.

A wide faced gear 15, keyed or otherwise fixed to the shaft 10, meshes with a wide faced pinion 16 preferably formed integral with an intermediate shaft 17 journalled in the housing. The shaft 17 also carries a gear 18 which meshes with a pinion 19 preferably formed integral with a high speed shaft 20 journalled in and projecting from the housing.

In this instance, the shaft 20 is shown supported at opposite ends in roller bearings 21, preferably of a well known self aligning type, and is driven by appropriate means, such as a pulley 22 fixed to one end thereof. The shaft 20 is also shown equipped with a brake drum 23 fixed to the other end thereof.

It will be noted that the diameter of pinion 16 is considerably less than its face width so that there is a tendency for the pinion to bend under the heavy reaction imposed upon it by the gear 15, and any deflection from such causes produces an undesirable concentration of load upon the end portions of the pinion and gear teeth. In this instance such deflections are reduced to a minimum by a novel arrangement of gears and bearings.

This is accomplished in the speed reducer shown by arranging the shafts 20 and 10 at opposite sides of the shaft 17, and by supporting the shaft 17 in bearings 24 and 25 disposed adjacent the opposite ends of the pinion 16, with one of the bearings 25 between the pinion and gear 18. The span between the bearings 24 and 25 is thus reduced to a minimum, and the gear 18 is thus supported upon the projecting end of the pinion shaft beyond the bearing 25.

With the parts thus arranged, the reaction of the pinion 19 upon the gear 18 imposes a load on the projecting end of shaft 17 which, reacting upon the bearing 25 as a fulcrum, tends to bend the pinion 16 in a direction opposite to that induced by the reaction of gear 15 thereon. That is to say, when the pinion 16, for example, is driving the gear 15 clockwise the gear 15 reacts to impose a downward thrust on the pinion 16, tending to bow it downwardly, and at the same time the pinion 19, driving the gear 18 counter-clockwise, imposes a downward thrust upon the gear 18 and consequently upon the projecting end of shaft 17, which thrust reacts through the bearing 25, as a fulcrum, to bow the pinion 16 upwardly. Pinion deflection induced by the gear 15 is thus counteracted, at least in part, by the deflection induced by the reaction between the pinion 19 and gear 18.

Various changes may be made in the embodiment of the invention hereinabove specifically described without departing from the invention as defined in the appended claims.

I claim:—

1. A gear set comprising a shaft, a pinion on said shaft having a face width so much greater than the diameter of said pinion as to render the latter deflectable under load, bearings for said shaft disposed adjacent the ends of said pinion, said shaft having an end projecting beyond one of said bearings and supported solely thereby, a gear on the projecting end of said shaft, a second shaft arranged at one side of first named shaft having a gear meshing with said pinion, and a third shaft arranged at the other side of said first named shaft and having a pinion meshing with said first named gear, the axes of said shafts being disposed substantially in a common plane and the central plane of said first named gear being disposed beyond said bearings.

2. A gear set comprising a shaft, a pinion on said shaft having a face width so much greater than the diameter of said pinion as to render the latter deflectable under the load, self-aligning bearings for said shaft disposed adjacent the ends of said pinion, said shaft having an end projecting beyond one of said bearings and supported solely thereby, a gear on the projecting end of said shaft, a second shaft arranged at one side of first named shaft having a gear meshing with said pinion, and a third shaft arranged at the other side of said first named shaft and having a pinion meshing with said first named gear, the axes of said shafts being disposed substantially in a common plane and the central plane of said first named gear being disposed beyond said bearings.

3. A gear set comprising a housing, a shaft journalled at one end in one wall of said housing, a pinion on said shaft having a face width materially greater than its diameter, a gear within said housing fixed to the other end of said shaft, a bearing disposed wholly between said pinion and the central plane of said gear and constituting the sole support for the last mentioned shaft end, a second shaft disposed at one side of said first named shaft and journalled in the opposite walls of said housing, a gear on said second shaft meshing with said pinion, a third shaft disposed at the opposite side of said first named shaft, and a pinion on said third shaft meshing with said first named gear, the axes of said shafts being disposed substantially in a common plane.

WALTER P. SCHMITTER.